United States Patent
Bianco

(10) Patent No.: US 6,267,877 B1
(45) Date of Patent: Jul. 31, 2001

(54) SEPARATION OF A WASTE PHASE FROM A WATER BASED EMULSION

(76) Inventor: Anthony J. Bianco, 1600 Dorchester, Brunswick, OH (US) 44212

(*) Notice: Subject to any disclaimer, the term of this patent is extended or adjusted under 35 U.S.C. 154(b) by 0 days.

(21) Appl. No.: 09/512,851

(22) Filed: Feb. 25, 2000

(51) Int. Cl.⁷ .................................................. B01D 17/05
(52) U.S. Cl. .......................... 210/95; 210/197; 210/208; 210/219; 210/523; 210/532.1; 210/540; 210/708
(58) Field of Search .................................. 210/540, 538, 210/523, 532.1, 207, 208, 219, 708, 738, 95, 197

(56) References Cited

U.S. PATENT DOCUMENTS

| | | | |
|---|---|---|---|
| 0,639,519 | 12/1899 | Camiz et al. .................. | 210/800 |
| 1,045,811 * | 12/1912 | Buhring ....................... | 210/540 |
| 1,085,135 * | 1/1914 | Kelly, Jr. ..................... | 210/540 |
| 1,159,044 * | 11/1915 | Kelly, Jr. . | |
| 1,200,951 * | 10/1916 | Kelly, Jr. ..................... | 210/540 |
| 1,543,621 * | 6/1925 | Ruckstuhl ..................... | 210/540 |
| 1,682,256 * | 8/1928 | Schwarz ....................... | 210/540 |
| 2,307,154 * | 1/1943 | Osuna .......................... | 210/540 |
| 2,744,630 * | 5/1956 | Hughes ........................ | 210/540 |
| 2,874,842 * | 2/1959 | Krofta ......................... | 210/540 |
| 3,666,108 * | 5/1972 | in't Veld ...................... | 210/540 |
| 4,082,669 * | 4/1978 | Bainbridge ................... | 210/540 |
| 4,252,649 | 2/1981 | Favret, Jr. .................... | 210/538 |
| 4,372,854 | 2/1983 | Szereday ...................... | 210/538 |
| 5,690,813 | 11/1997 | Coale .......................... | 210/540 |

* cited by examiner

Primary Examiner—Robert J. Popovics
(74) Attorney, Agent, or Firm—John P McMahon

(57) ABSTRACT

A settling tank for separating an emulsion with a known volumetric percentage of oil includes lower and upper settling chambers. The emulsion is settled by gravitational means and can be aided by demulsifying agents. Once settled, a layer of oil floats on top of the water. The volumes of the lower and upper settling chambers are configured so that all of the oil settles within the upper settling chamber. The oil can then be drained from the upper settling chamber leaving only clean water in the tank structure.

10 Claims, 3 Drawing Sheets

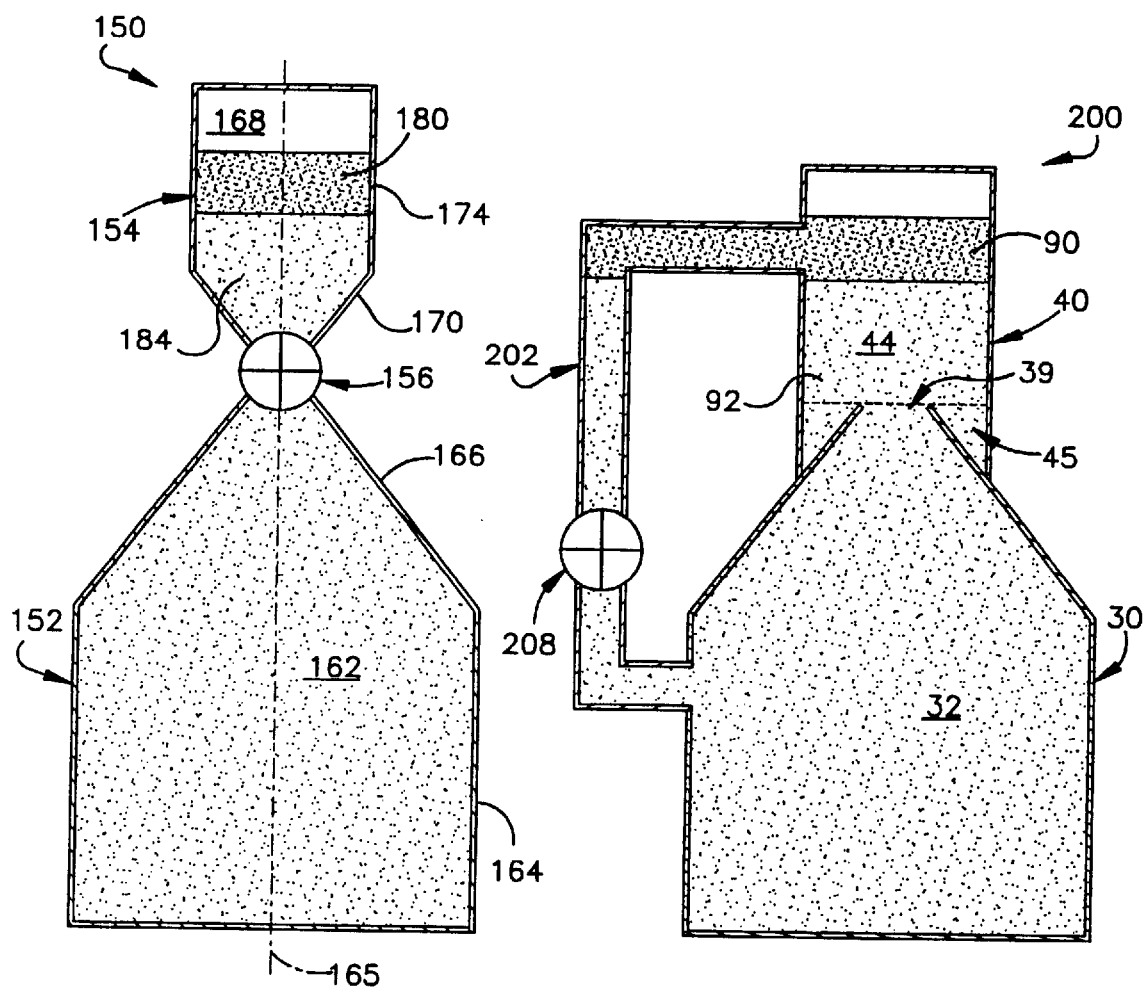

SEPARATION OF A WASTE PHASE FROM A WATER BASED EMULSION

FIELD OF THE INVENTION

The present invention relates to settling tanks that separate emulsions.

BACKGROUND OF THE INVENTION

Settling tanks are used to separate emulsions into their constituents. Separation of the constituents can be achieved by skimming, heating, or chemical processes.

SUMMARY OF THE INVENTION

The present invention is an apparatus for separating oil from a water based emulsion with a known volumetric percentage of oil. The apparatus includes a tank structure configured to contain the emulsion. The tank structure defines a lower settling chamber with an opening at a terminal upper end. The tank structure further defines an upper settling chamber that communicates with the lower settling chamber through the opening. The opening allows the oil in the emulsion to rise from the lower settling chamber into the upper settling chamber, and thereby to form an oil layer that floats on the water at a level above the opening. The lower settling chamber has a first volume. The upper settling chamber has a second volume, including a partial volume above the opening. Importantly, the partial volume above the opening, as a percentage of the sum of the first and second volumes, is greater than the known volumetric percentage of oil in the emulsion.

BRIEF DESCRIPTION OF THE DRAWINGS

FIG. 3 is a schematic view of a second embodiment of the present invention; and

FIG. 4 is a schematic view of a third embodiment of the present invention.

DESCRIPTION OF A PREFERRED EMBODIMENT

Figure 1:
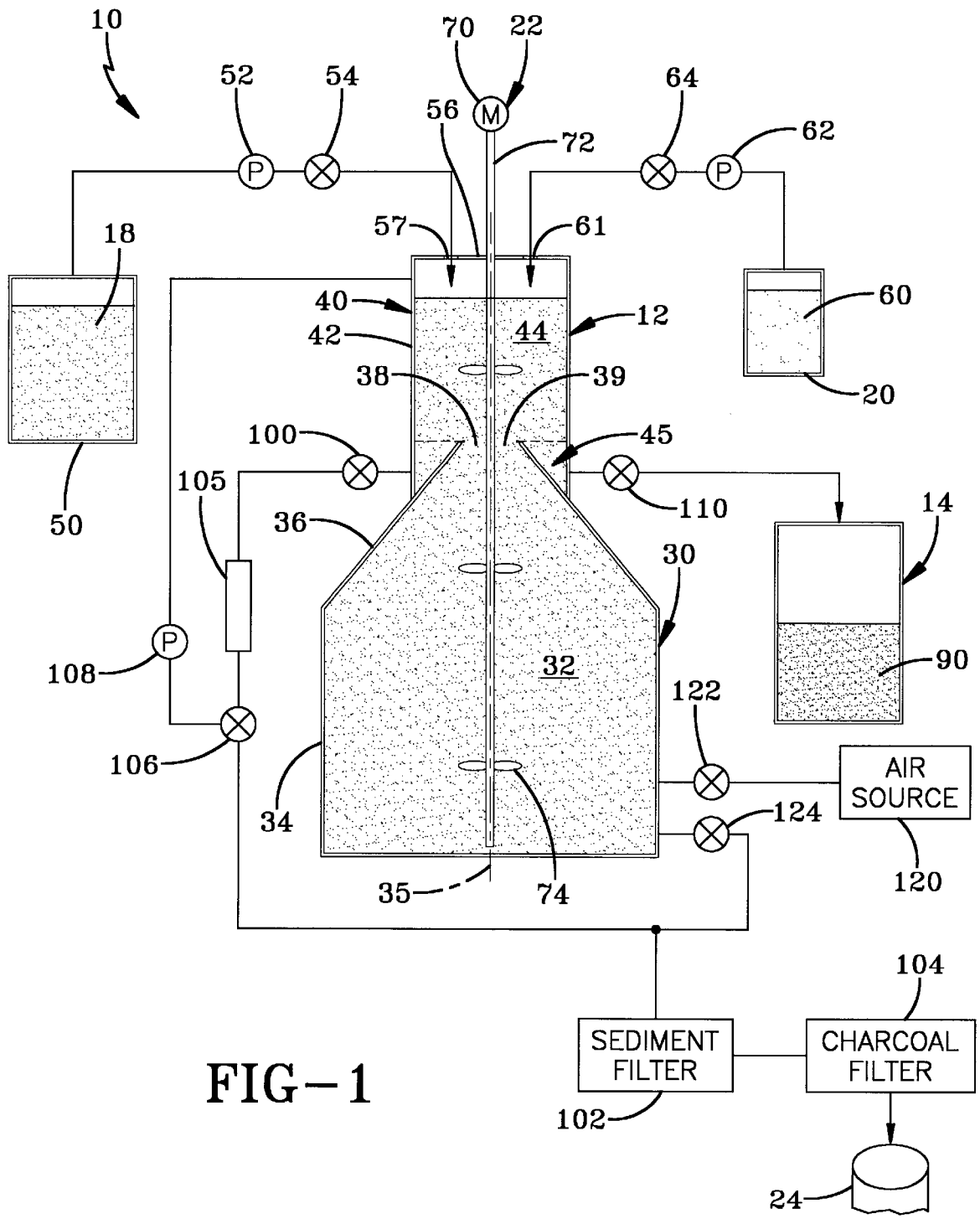
FIGS. 1 and 2 are schematic views of a first embodiment of the present invention.

An apparatus 10 comprising a first embodiment of the present invention is shown schematically in FIG. 1. The apparatus 10 includes a settling tank 12 and an oil recovery tank 14. The settling tank 12 is configured to separate oil from water upon settling of a water based emulsion 18 in the tank 12. Such settling occurs under the influence of gravity, and is promoted by the action of a liquid demulsifying agent 20 which is mixed into the emulsion 18 by a mixing apparatus 22. The oil is then drained to the recovery tank 14. The water remaining in the tank 12 is clean enough to be drained to the sewer 24.

A lower portion 30 of the settling tank 12 defines a lower settling chamber 32. The lower portion 30 of the tank 12 has a major body wall 34 with a cylindrical configuration centered on an axis 35. The lower portion 30 of the tank 12 further has an upper end wall 36 with a frusto-conical configuration centered on the axis 35. An annular edge 38 of the end wall 36 defines a circular opening 39 in a horizontal plane at the top of the end wall 36. In the preferred embodiment of the invention, the opening 39 is a solitary inlet port which includes the entire flow area through which the emulsion 18 can enter the lower settling chamber 32.

An upper portion 40 of the tank 12 has a major cylindrical body wall 42. That body wall 42 projects coaxially upward from the end wall 36 of the lower tank portion 30, and has a diameter that is substantially less than the diameter of the lower cylindrical body wall 34. In the preferred embodiment, the diameter of the upper body wall 42 is not greater than about half the diameter of the lower body wall 34. In this configuration, the upper portion 40 of the tank 12 defines an upper settling chamber 44 which is substantially narrower than the lower settling chamber 32. An oil recovery region 45 of the upper settling chamber 44 is defined by and between the cylindrical upper body wall 42 and the frusto-conical end wall 36. The oil recovery region 45 thus extends axially downward and radially outward from the level of the opening 39.

The emulsion 18 is conveyed from a storage container 50, such as a fifty gallon drum, to the tank 12 by the use of a pump 52 and an inlet valve 54. A top wall 56 of the tank 12 has an inlet port 57 through which the emulsion 18 preferably enters the tank 12. The emulsion 18 is pumped into the tank 12 until the tank 12 is nearly filled. An overflow apparatus may be used to control the upper-most level of the emulsion 18 in the tank 12.

The demulsifying agent 20 is similarly conveyed from a source container 60 to an inlet port 61 by the use of a corresponding pump 62 and a corresponding inlet valve 64. In accordance with this feature of the invention, the approximate concentration of oil in the emulsion 18 is first determined, such as by the use of a refractometer, and the appropriate amount of demulsifying agent 20 is then determined on the basis of the concentration of oil and the total volume of the emulsion 18 in the tank 12. The demulsifying agent 20 may have any suitable composition known in the art.

The mixing apparatus 22 in the preferred embodiment includes a motor 70 with a rotatable output shaft 72 extending vertically through the tank 12 along the axis 3 5. A plurality of mixer blades 74 are mounted on the shaft 72 so as to homogenize or substantially homogenize the mixture of emulsion 18 and demulsifying agent 20 throughout the upper and lower settling chambers 44 and 32 in the tank 12. Any other suitable method or apparatus for mixing, such as a jet of pressurized air, could be used to induce turbulence sufficient to ensure uniform or substantially uniform dispersion of the demulsifying agent 20 throughout the volume of emulsion 18 in the tank 12.

The mixture of emulsion 18 and demulsifying agent 20 is allowed to remain undisturbed in the tank 12 for a period of time that is preferably within the range of about one hour to about twenty four hours. During this time the oil in the lower settling chamber 32 rises to the upper settling chamber 44 through the opening 39. That oil, along with the oil initially contained in the upper settling chamber 44, continues to rise from the level of the opening 39 to form a distinct layer (FIG. 2) of oil 90 which floats on the water 92 at a level spaced upward from the opening 39.

Figure 2:
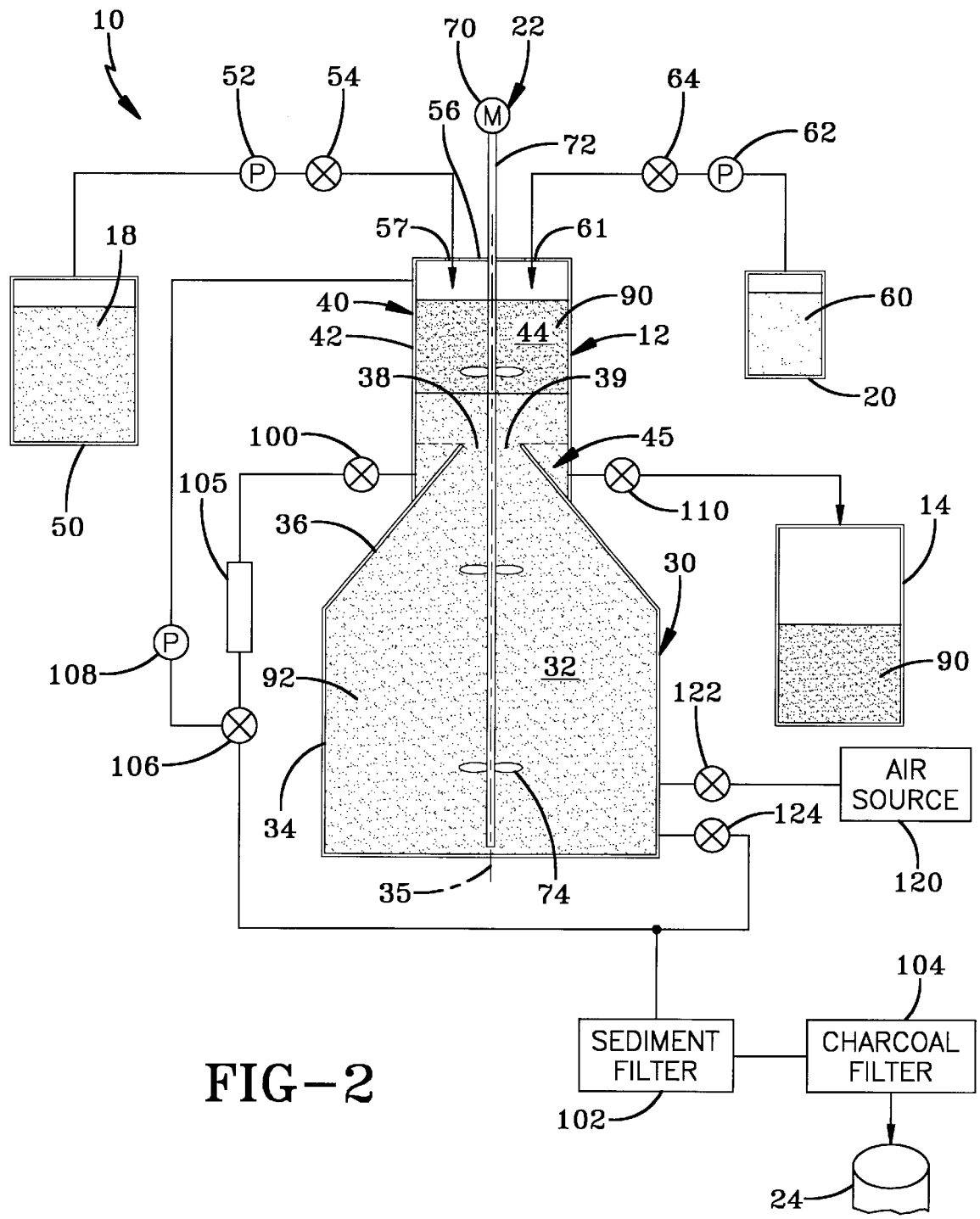

The configuration of the tank 12 helps to ensure that the volume of water 92 that settles in the upper chamber 44 will support the oil layer 90 at a location spaced upward from the opening 39, as shown in FIG. 2. In accordance with this feature of the invention, the tank 12 is one of a plurality of similar tanks that have differently sized upper and lower settling chambers 32 and 44. Each tank 12 is sized with reference to the concentrations of oil in the emulsions that are to be settled in the tank in accordance with the invention. For example, the emulsion 18 in the preferred embodiment of the invention comprises waste coolant obtained from machine shop equipment such as lathes and the like, and contains oil at a concentration within the range of about 5 percent to about 20 percent by volume. The partial volume of the tank 12 that is located beneath the opening 39 is somewhat less than about 80 percent of the total volume of the emulsion 18 that is placed in the tank 12 for settling. The partial volume of the upper chamber 44 that is located above the opening 39 is correspondingly greater than about 20 percent of the total volume of emulsion 18 in the tank 12. For a given volume of the lower chamber 32, the relatively narrow configuration of the upper chamber 44 helps to ensure that the appropriate partial volume of the upper chamber 44 is spaced upward from the level of the opening 39 so that the oil layer 90 will be spaced upward from the opening 39.

The cylindrical upper body wall 42 of the tank 12 is preferably formed of a material that is translucent sufficiently for an operator of the apparatus 10 to visually distinguish the oil layer 90 from the underlying water 92 so as to determine whether or not the oil 90 has settled sufficiently from the emulsion 18 for removal from the tank 12. If so, an outlet valve 100 is shifted from a normally closed condition to an open condition in which it drains the water 92 from the oil recovery region 45. The water 92 flowing outward through the valve 100 is discharged to the sewer 24, and may be filtered by the use of a sediment filter 102 and/or a charcoal filter 104.

As the water 92 in the oil recovery region 45 flows outward through the valve 100, the oil layer 90 is drawn downward toward and into the oil recovery region 45. The valve 100 is shifted back to its closed condition when the oil layer 90 approaches the level at which the oil 90 also would flow outward through the valve 100. If oil 90 flows outward with the water 92 through the valve 100, as indicated by a viewing window 105, a recirculation valve 106 and a recirculation pump 108 are operated to return the oil 90 and water 92 to the upper settling chamber 44. A second outlet valve 110 is then shifted from a normally closed condition to an open condition in which the oil 90 is drained from the oil recovery region 45 to the recovery tank 14.

The upper level of the oil 90 moves downward past the opening 39 upon draining of the oil 90 from the oil recovery region 45. A thin film of the oil 90 then forms over the surface of the water 92 at the opening 39, but is broken and pulled off of the water surface at the opening 39 by the cohesion and surface tension of the oil 90 flowing downward away from the opening 39 along the frusto-conical contour of the end wall 36. Preferably, the film of oil 90 is further broken and moved away from the water surface at the opening 39 by a bubble of air that is introduced into the lower settling chamber 32 by the use of an air source 120 and a pneumatic inlet valve 122. A third outlet valve 124 is then shifted from a normally closed condition to an open condition in which it drains the remainder of the clean water 92 from the lower settling chamber 32 to the sewer 24.

The second embodiment of the present invention includes an alternate settling tank 150 shown in FIG. 3. The settling tank 150 includes a lower portion 152, an upper portion 154 and an isolation valve 156 that connects the lower portion 152 to the upper portion 154. The lower portion 152 of the settling tank 150 defines a lower settling chamber 162. A major body wall 164 of the lower portion 152 of the tank 150 has a cylindrical configuration centered on an axis 165. An upper end wall 166 of the lower portion 152 of the tank 150 has a frusto-conical configuration centered on the axis 165.

The upper portion 154 of the tank 150 defines an upper chamber 168. The upper portion 154 has a lower wall 170. This lower wall 170 projects outward with a frusto-conical configuration centered on the axis 165. The upper portion 154 of the tank 150 further has a cylindrical upper wall 174 centered on the axis 165. The volumetric percentages of the upper and lower settling chambers 168 and 162 of the settling tank 150 are preferably equivalent to the volumetric percentages of the upper and lower settling chambers 44 and 32 of the tank 12.

The isolation valve 156 is a normally open valve. While the emulsion 18 is settling in the tank 150, oil in the lower chamber 162 rises to the upper chamber 168 through the isolation valve 156. After the emulsion 18 has settled, an oil layer 180 rests on a water layer 184. The contents of the upper and lower chambers 168 and 162 can then be drained from the tank 150 in the same manner as described above.

The third embodiment of the present invention includes an alternate settling tank 200. As shown in FIG. 4, the tank 200 includes many parts that are substantially the same as corresponding parts of the tank 12 described above. This is indicated by the use of the same reference numbers for such corresponding parts in FIGS. 1 and 2. The settling tank 200 further comprises a balance tube 202 to facilitate the removal of oil from the tank 200. The balance tube 202 communicates with the upper and lower portions 40 and 30 of the tank 200.

When the tank 200 is filling with the emulsion 18, the balance tube 202 fills to the same level as the tank 200. After the emulsion 18 has settled and the oil layer 90 rests on top of the water layer 92, the oil layer 90 is drained from the oil recovery region 45 in the same manner as described above. As the oil layer 90 is drained from the oil recovery region 45, water from the balance tube 202 enters the lower portion 30 of the tank 200 from the balance tube 202. The water entering the lower portion 30 causes the water that is already in the lower portion 30 to push upward against the layer of oil 90 that rests on the opening 39 and thereby to promote movement of the oil 90 into the oil recovery region 45.

A balance valve 208 is located on the balance tube 202. The balance valve 208 remains open as the emulsion 18 fills the tank 200 and settles to form the oil and water layers 90 and 92.

The balance valve 208 also remains open as the oil 90 is drained from the tank 200. The balance valve 208 is closed before the water 92 is discharged to the sewer 24, thereby isolating the remaining oil 90 in the balance tube 202 from the lower settling tank 30.

The invention has been described with reference to a preferred embodiment. Those skilled in the art will perceive improvements, changes and modifications. Such improvements, changes and modifications are intended to be within the scope of the claims.

What is claimed is:

1. Apparatus for separating oil from a water based emulsion, said apparatus comprising:
    a tank structure configured to contain the emulsion, said tank structure defining a lower settling chamber with an opening at a terminal upper end of said lower settling chamber, and further defining an upper settling chamber communicating with said lower settling chamber through said opening such that oil in the emulsion can rise from said lower settling chamber to said upper settling chamber to form an oil layer floating on the water at a level spaced upward from said opening;
    an isolation valve interposed between said lower and upper settling chambers;
    a first upper outlet valve shiftable from a normally closed condition to an open condition draining a gravitational flow of water from said upper settling chamber so as to draw the oil layer downward toward said opening;

a second upper outlet valve shiftable from a normally closed condition to an open condition draining a gravitational flow of the oil from said upper settling chamber, said tank structure having a frusto-concical wall portion which is tapered downward away from said opening so as to direct the oil downward away from said opening upon said draining of the oil from said upper settling chamber; and a lower outlet valve shiftable from a normally closed condition to a open condition draining a gravitational flow of water from said lower settling chamber.

2. Apparatus as defined in claim 1, wherein said opening is a solitary inlet port defining the entire flow area through which the emulsion can enter said lower settling chamber.

3. Apparatus as defined in claim 1, wherein said tank structure is comprised of material through which the floating layer of oil can be visually distinguished from the water in said upper settling chamber.

4. Apparatus as defined in claim 1, wherein said lower settling chamber has a generally cylindrical major portion with a first diameter, and said upper settling chamber has a generally cylindrical major portion with a second diameter not greater than about half said first diameter.

5. Apparatus as defined in claim 1, further comprising a recirculation system configured to direct the emulsion from said first upper outlet valve back into said upper settling chamber.

6. Apparatus as defined in claim 5, wherein said recirculation system includes a window structure through which the emulsion can be viewed to assess the oil content of the emulsion.

7. Apparatus as defined in claim 1, further comprising a mixing apparatus operative to mix the contents of said upper and lower settling chambers.

8. Apparatus as defined in claim 7, wherein said mixing apparatus comprises a plurality of mixing blades mounted on a rotatable shaft extending vertically from said upper settling chamber to said lower settling chamber through said opening.

9. Apparatus as defined in claim 1, further comprising a pneumatic inlet valve operative to direct a pressurized flow of air into said lower settling chamber at a location beneath said opening.

10. Apparatus as defined in claim 1, further comprising a source of a demulsifying agent and a system configured to convey said demulsifying agent from said source into said upper and lower settling chambers.

* * * * *